Nov. 29, 1932.  W. H. McGLADE  1,889,684
ROTARY VALVE FOR INTERNAL COMBUSTION ENGINES
Filed July 14, 1931  2 Sheets-Sheet 1
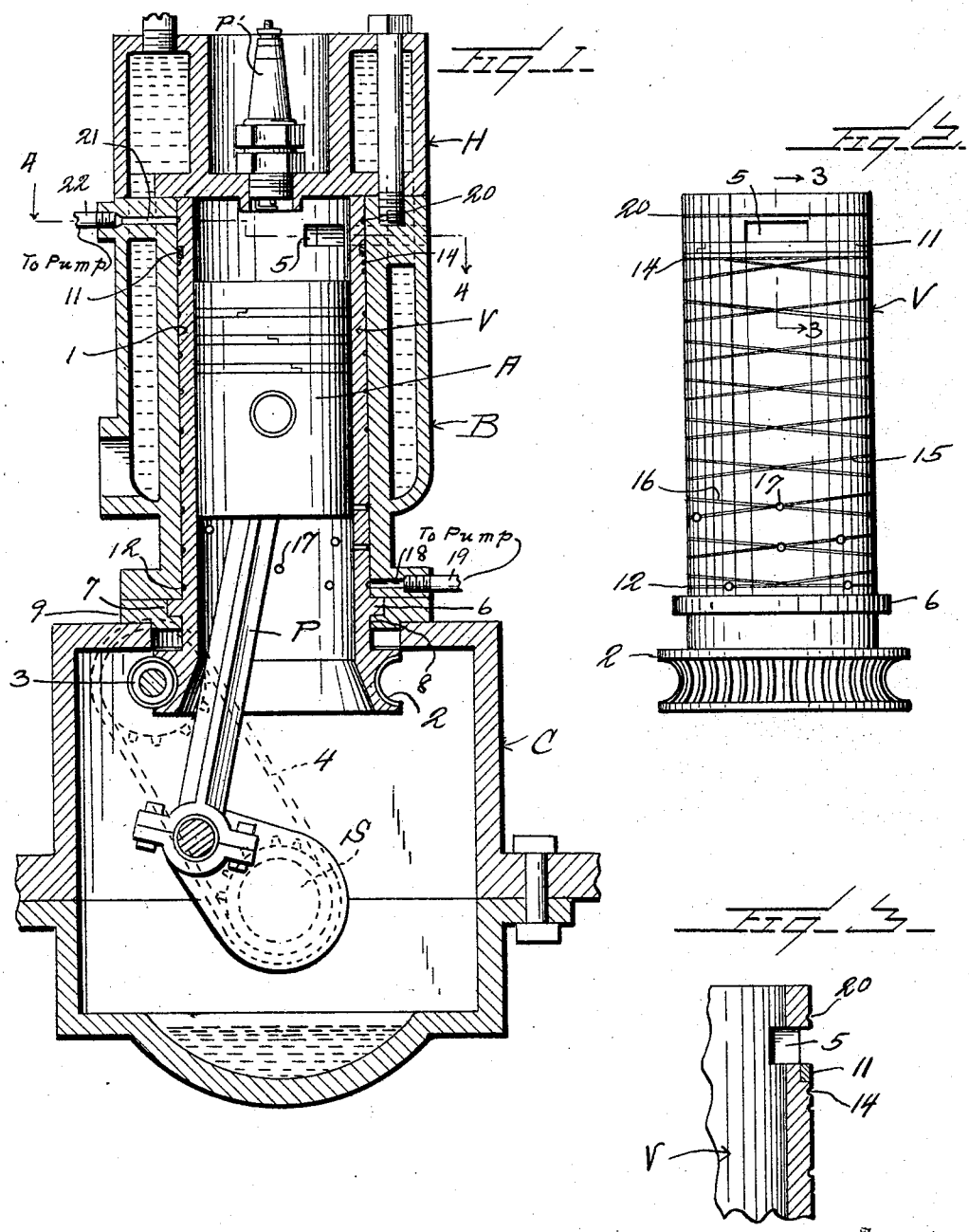
Inventor
W. H. McGlade
By Watson E. Coleman
Attorney

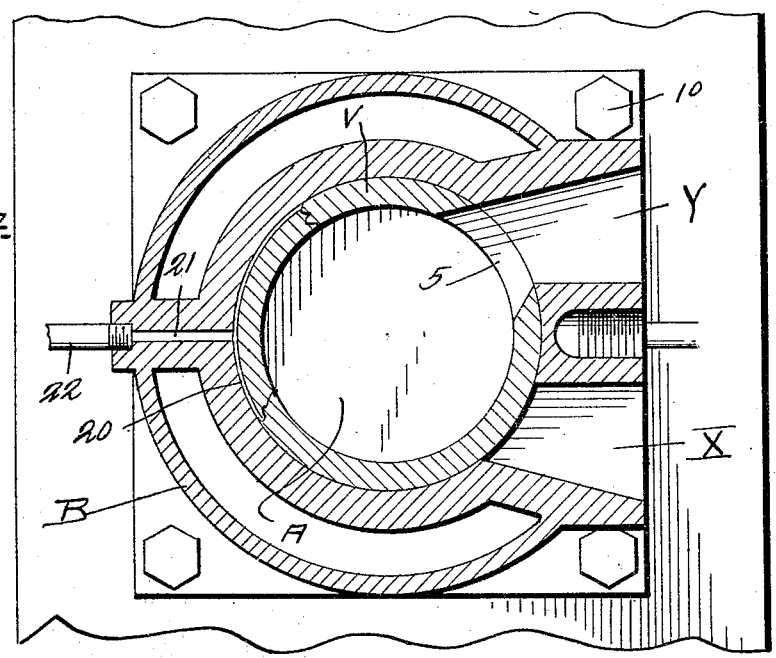
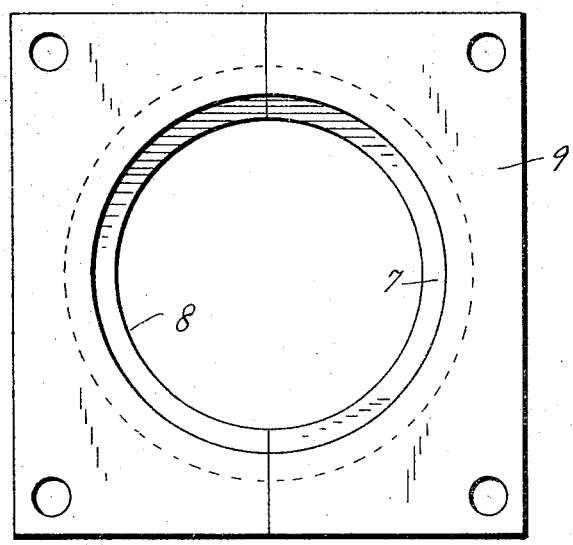

Patented Nov. 29, 1932

1,889,684

UNITED STATES PATENT OFFICE

WAYNE H. McGLADE, OF WELLINGTON, KANSAS

ROTARY VALVE FOR INTERNAL COMBUSTION ENGINES

Application filed July 14, 1931. Serial No. 550,742.

This invention relates to a rotary valve for an internal combustion engine, and it is primarily an object of the invention to provide a valve of this kind having associated therewith means for effectively lubricating the same whereby desired effective functioning of the valve is assured.

It is also an object of the invention to provide a valve of this kind which constitutes in its assembly a lining for a cylinder and wherein the reciprocating plunger travels directly within the valve, said valve being driven in required time to assure the desired opening and closing of the inlet and exhaust ports in proper sequence.

An additional object of the invention is to provide a rotary valve for an internal combustion engine constructed, assembled and operating in a manner assuring prolonged life of the motor with which it is employed and also wherein the construction of the motor is materially simplified and more especially in the elimination of cams, lifters, springs, etc. now employed in connection with the general types of motors in use.

The invention also has for an object to provide a rotary valve constructed, assembled and operating in a manner whereby its action is positive yet obtained with simplicity and wherein the general assembly of the valve and other parts of the motor is such to assure extreme lightness per horse power thereby rendering the motor especially adapted to airplane use.

A further object of the invention is to provide a rotary valve having associated therewith means whereby oil under pressure will be supplied thereto at all times and under all speeds thereby materially prolonging the life of the motor whether the motor be of a high speed type or a powerful slow speed type.

The invention consists in the details of construction and in the combination and arrangement of the several parts of my improved rotary valve for an internal combustion engine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation illustrating an internal combustion motor having associated therewith a rotary valve constructed in accordance with an embodiment of my invention;

Figure 2 is an elevational view of my improved valve unapplied;

Figure 3 is a detailed sectional view taken substantially on the line 3—3 of Figure 2;

Figure 4 is an enlarged sectional view taken substantially on the line 4—4 of Figure 1;

Figure 5 is a view in top plan of the retaining plates for the valve unapplied.

As disclosed in the accompanying drawings, C denotes a casing of any desired construction in which operates a conventional crank shaft S in operative connection through the medium of the pitman P with a piston A. The piston A, as herein disclosed, snugly fits for rectilinear travel within the bore of my improved rotary valve V which constitutes a tubular member or sleeve of desired dimensions and which, of course, is produced from a material assuring maximum of efficiency.

The valve V when applied snugly engages within the cylinder bore 1 provided in a motor block B, said valve V however being readily rotatable within said cylinder bore 1. Bolted or otherwise secured to the block B is a cylinder head H carrying a spark plug P' which, in the assembly disclosed, is arranged axially of the cylinder bore.

The valve V is of a length to extend from the outer or closed end of the cylinder bore 1 to a desired point beyond the opposite end of said bore or, as illustrated in Figure 1, within the casing C. This end portion of the valve member V has formed therewith a worm gear 2 eccentric to the axis of the valve member V. Coacting with the worm gear 2 is a worm 3 suitably supported within the casing C and adapted to be driven in any desired manner and at requisite speed from the crank shaft S as generally indicated by broken lines at 4.

It is believed to be self-evident that the speed of the worm 3 and the relative ratios of the worm 3 and worm gear 2 are such to assure the rotation of the valve member V at a time speed to assure the opening and closing of the inlet port X and the outlet port Y in proper sequence.

The end portion of the valve member V adjacent to the head H is provided in its wall with a port 5 adapted, upon rotation of the valve member V, to be brought into proper register with the ports X and Y.

The valve member V slightly inwardly of the worm gear 2 carries an outstanding surrounding flange 6 which is snugly received within a rabbet 7 formed in the upper portion of a central opening 8 provided through the butting plates 9 of duplicate construction and dimensions. These plates 9 rest upon the casing C and also provide a mounting for the block B, said block B and plates 9 being held to the casing C by the bolts 10 or otherwise as may be preferred. The applied block B, as is clearly illustrated in Figure 1, provides means whereby the valve member V is effectively maintained in working position and more especially against endwise movement.

The valve member V inwardly of but closely adjacent to its port 5 is provided with a surrounding compression ring 11 for coaction with the wall of the cylinder bore 1.

From the foregoing it is believed to be clearly apparent that my improved rotary valve is simple in its construction, mounting and operation and that by its use a motor may be produced that is extremely light and compact yet possessing a maximum of efficiency. However, for the successful operation of the valve member V it is essential that means be provided to assure effective lubrication therefor.

The periphery of the valve member V at a point in close proximity to the flange 6 is provided therearound with a continuous oil groove 12 and the member V at a point in close proximity to the compression ring 11 is provided with a second similar oil groove 14. The grooves 12 and 14 are connected by the reversed spiral oil grooves 15 and 16. The lower portions of these grooves 15 and 16 are in communication with the openings 17 extending through the wall of the valve member V and discharging within the bore thereof. The engine block B in its lower part is provided with a passageway 18 in communication with the lower annular groove 12 and delivering to said passageway 18 is an oil line 19 leading from a suitable pump whereby oil under pressure will be delivered through the passageway 18 to the grooves 15 and 16. By the pressure of the oil it will be assured that the grooves 15 and 16 together with the grooves 12 and 14 will be maintained filled with oil, thus effective lubrication of the valve member V and more particularly with respect to the wall of the cylinder bore 1 will be assured. In the event of excessive oil pressure or excessive oil, the oil will readily pass through the openings 17 and be delivered through the lower portion of the valve member V and discharged within the valve casing C.

It is to be noted that the openings 17 are all positioned below the piston A when the same is at the limit of its movement toward the head H so that effective discharge of excess oil will be assured at the completion of the compression and scavenger strokes of the piston A and thus allowing full opportunity for the excess oil to be expelled through the openings 17.

The efficiency of the valve member V in its operation is also further assured and maintained by providing proper lubrication above or outwardly of the compression ring 11 and for this purpose the periphery of the valve member V outwardly of said ring 11 and also outwardly of the port 5 has formed therein the continuous oil groove 20 which is in communication at all times with an oil passageway 21 provided through the upper or outer portion of the block B. Discharging within this passageway 21 is an oil line 22 leading from a pump or other source of oil supply under pressure.

It is also believed to be self-evident that the excess oil as expelled inwardly of the valve member V through the openings 17 will provide lubrication for the piston A working within said member V.

From the foregoing description it is thought to be obvious that a rotary valve for an internal combustion engine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

An internal combustion engine, the combination with a casing, a plate mounted upon the casing provided with an opening, the upper portion of the wall of the opening being provided with a rabbet, an elongated sleeve valve extending within the casing through the opening in the plate, said sleeve valve having an outstanding flange seating within the rabbet of the plate, a block having an engine bore in which the sleeve valve is snugly and rotatably received, said block resting upon the plate and overlying the flange of the sleeve valve within the rabbet, a piston working within the sleeve valve, said sleeve valve having a port, the block having an inlet port and an exhaust port with which the port of the sleeve valve is adapted to register in time sequence, means for igniting the charge within the sleeve valve, and means for rotating the sleeve valve at proper speed.

In testimony whereof I hereunto affix my signature.

WAYNE H. McGLADE.